Patented Mar. 24, 1931

1,797,994

UNITED STATES PATENT OFFICE

JOHN E. MORROW, OF OAKMONT, PENNSYLVANIA, ASSIGNOR TO ALUMINUM COMPANY OF AMERICA, OF PITTSBURGH, PENNSYLVANIA, A CORPORATION OF PENNSYLVANIA

PRECIPITATION OF ALUMINUM FLUORIDE

No Drawing. Application filed September 20, 1928. Serial No. 307,347.

This invention relates to a method whereby aluminum fluoride may be precipitated in a substantially pure, easily recoverable and granular form from dilute aluminum fluoride solutions.

Solutions of aluminum fluoride are obtained from the treatment of aluminus materials such as kaolin, bauxite, clay, etc., with hydrofluoric or hydrofluosilicic acids. Aluminum fluoride is a valuable chemical compound and has many uses. Therefore, it is desirable that suitable methods be provided whereby the aluminum fluoride content of these and similar solutions may be easily and economically recovered. Although it is possible to evaporate the solution to dryness and thereby obtain the compound, such procedure is very impractical and expensive when the solutions are dilute. Also the separated product is often contaminated by impurities which were present in the original solutions. It has been recognized that the best method by which to obtain aluminum fluoride from dilute solutions is to directly precipitate the compound without attempting to concentrate the solutions. For example, it has been proposed to separate aluminum fluoride in granular form by heating dilute solutions containing the compound to high temperatures in autoclaves or similar pressure vessels. This method has been found to be satisfactory on a small scale but the use of expensive acid resistant pressure vessels and the expense and difficulty attendant to the handling of larger volumes of solution in pressure systems precludes extensive use as an industrial method.

It is also possible to precipitate aluminum fluoride from dilute solutions by merely heating the solution. This precipitate, however, scales to the sides of the vessels, is not always granular and the recovery of the precipitate is therefore often difficult.

Probably the best method which has been described up to this time for handling large volumes of solution comprises the precipitation of aluminum fluoride by the addition of hydrofluoric acid which acts as a precipitating agent. The principal objections to this process are the necessity of using comparatively pure hydrofluoric acid as a precipitating agent and the acidity of the resultant solution which makes necessary the use of acid resistant and therefore expensive containers.

I have found that dilute aluminum fluoride solutions may be treated to produce a granular, easily filtrable and non-adherent precipitate by a method which has none of the objectionable features above mentioned and by which the recoveries of aluminum fluoride obtained are fully as high as or higher than those obtained by the above described processes. This method is based on my discovery that if a finely divided inert material is added to dilute aluminum fluoride solution and the solution is heated to temperatures which are high but below the boiling point of the solution, a precipitate of aluminum fluoride which does not scale or adhere to the sides of the precipitating vessel and which is in a substantially pure and granular form will be obtained. I have further discovered that the finely divided substance which must be added as an accelerator or seed and which acts as nuclei for the precipitated compound may consist of any finely divided material which does not appreciably enter into chemical reaction with the solution or in a similar manner interfere with good results. However, for reasons which will later appear, the most suitable material for this purpose is aluminum fluoride.

In practicing my method of precipitation, an amount of finely divided material is added to a dilute solution of aluminum fluoride and this seed-containing solution is digested at temperatures of preferably about 90 to 95° centigrade for a period of time which does not usually exceed 6 hours. During this period of digestion, about 80 to 90 per cent of the dissolved aluminum fluoride precipitates in the form of an easily filtrable crystalline product which is comparatively pure. This product is believed to have a composition represented by the formula $Al_2F_6 \cdot 7H_2O$ but may conceivably vary in composition. As has before been stated it is possible to use as finely divided seed material a substance which will remain substantially inert in the solution or will not enter into contaminating chemical reaction with it. Whatever the material, it will be found in the precipitated aluminum fluoride product and for this reason it is advisable to use as a seed charge a material which is not widely variant from the aluminum fluoride product and which by its presence will not render the aluminum fluoride unfit for use in chemical or other processes. Such suitable substances are alumina, preferably calcined, cryolite, and aluminum fluoride. In experimenting with these materials, it has been found that aluminum fluoride is the most suitable material to be used as a seed charge since the product produced by it is in a highly granular and non-gelatinous form and furthermore, the seed charge does not in any way contaminate the product. For example, when aluminum fluoride, calcined alumina, and cryolite were added to separate samples of the same dilute aluminum fluoride solution and these resulting solutions were treated in substantially the same manner, it was found that the cryolite produced yields of aluminum fluoride as high as 88 per cent. However, the product was in a somewhat gelatinous form and was filtered from the solution with difficulty. In the case of the sample treated with the calcined alumina, the yields were somewhat lower than those obtained by the use of cryolite and aluminum fluoride and did not run much over 75 per cent of the original aluminum fluoride content of the solution. The solution to which aluminum fluoride had been added as a seeding agent produced a yield of about 87 per cent of the original aluminum fluoride contained in the solution and this precipitate was in a satisfactory granular, non-gelatinous and easily filtrable form.

The amount of finely divided seeding material which is necessary to produce a high yield of precipitated aluminum fluoride does not appear to be of particular importance, and although it has been found desirable to use amounts corresponding to about 1 per cent of the weight of the aluminum fluoride solution, I have found that lesser amounts as well as much greater amounts will usually give the required results. The amounts of seed, however, will vary depending upon the source of the aluminum fluoride solution and the nature of the seeding material and the preferable proportion of seeding material may easily be determined by experiment for each type of solution to be treated. In the case of an aluminum fluoride solution containing about 113 grams per liter of aluminum fluoride, it has been found that a digestion period of 3 to 5 hours at a temperature of about 90° centigrade is sufficient to produce maximum or approximately maximum results. Under these conditions a digestion period of two hours will give recoveries of as high as 78 per cent of the dissolved aluminum fluoride while 1 hour will give recoveries of approximately 50 per cent. However, the digestion time at which the best results may be obtained may vary with the temperatures and the solutions used and this factor is one which may readily be determined by simple experiment.

I have found that in order to obtain the best results, the highest practical temperature should be used. For example, an aluminum fluoride solution containing 64 grams per liter of aluminum fluoride to which there had been added an amount of dry aluminum fluoride seed was heated for 3 hours at 95° centigrade with a resultant precipitation of 58.5 per cent of the original aluminum fluoride. In a similar solution which had been heated for 3 hours at 30° centigrade, only 14 per cent of the aluminum fluoride was precipitated and in another similar sample 48 per cent of the aluminum fluoride was precipitated after 3 hours time at 75° centigrade. The preferred temperature lies between 90 to 95° centigrade and at these temperatures the aluminum fluoride is precipitated in maximum amounts within a comparatively short period of time. However, it is possible to obtain satisfactory results at lower temperatures if heating is prolonged.

The exact conditions under which my process may best be practiced will depend upon the solutions employed and the facilities available. The following is cited as an example of the manner in which the process is preferably applied. To an aluminum fluoride solution containing 113 grams per liter of aluminum fluoride, there was added an amount of finely divided dry aluminum fluoride corresponding to 1 per cent of the weight of the solution. The seeded solution was heated at a temperature of 90° centigrade for a period of 3 hours. At the end of this time 82.2 per cent of the aluminum fluoride originally present in the solution had been recovered in the form of a granular and non-scaling precipitate. The precipitated product had the following analysis: $Al_2F_6$ 57.35 per cent, uncombined $Al_2O_3$ 5.46 per cent, $SiO_2$ nil, $Fe_2O_3$ 0.1 per cent, $Al_2(SO_4)_3$ 0.03 per cent. The product contained about 35 per cent combined water.

According to the provision of the patent statutes, I have described the principle and operation of my invention together with specific examples of how it may be practiced. However, I desire to have it understood that, within the scope of the appended claims, the invention may be practiced otherwise than as specifically described herein.

I claim:

1. The process of precipitating aluminum fluoride from an aluminum fluoride solution comprising adding to the solution a small amount of a finely divided inert material and subsequently heating the solution.

2. The process of precipitating aluminum fluoride in a granular form from an aluminum fluoride solution comprising adding to the solution a small amount of finely divided aluminum fluoride and subsequently heating the solution.

3. The process of precipitating aluminum fluoride in a granular form from aluminum fluoride solutions comprising adding to the solution a small amount of a finely divided inert material and heating the solution to a temperature of about 90 to 95° centigrade.

4. The process of precipitating aluminum fluoride in a granular form from aluminum fluoride solutions comprising adding to the solution a small amount of finely divided aluminum fluoride and subsequently heating the solution to a temperature of about 90 to 95° centigrade.

5. The process of precipitating aluminum fluoride in a granular form from aluminum fluoride solutions comprising adding to the solution a small amount of a finely divided inert material and heating the solution at a relatively high temperature until a major portion of the aluminum fluoride contained in such solution is precipitated in a granular and non-scaling form.

6. The process of precipitating aluminum fluoride in a granular form from aluminum fluoride solutions comprising adding to the solution a small amount of aluminum fluoride and heating the solution at a relatively high temperature until a major portion of the aluminum fluoride contained in such solution is precipitated in a granular and non-scaling form.

JOHN E. MORROW.